United States Patent [19]
Doerr et al.

[11] Patent Number: 5,909,294
[45] Date of Patent: Jun. 1, 1999

[54] FULL-DUPLEX WAVELENGTH DIVISION MULTIPLEXING SYSTEM USING SINGLE-DEVICE TRANSCEIVERS

[75] Inventors: Christopher Richard Doerr, Atlantic Highlands; Bernard Glance, Colts Neck Township; Kang-Yih Liou, Holmdel Township, all of N.J.

[73] Assignee: Lucent Technologies Inc., Murray Hill, N.J.

[21] Appl. No.: 08/857,347

[22] Filed: May 16, 1997

[51] Int. Cl.[6] .............................. H04B 10/24; H04J 14/02
[52] U.S. Cl. ......................... 359/114; 359/152; 359/130
[58] Field of Search ........................... 359/113–114, 152, 359/124–125, 130, 134

[56] References Cited

U.S. PATENT DOCUMENTS 5,661,585  8/1997  Feldman et al. ........................ 359/180

OTHER PUBLICATIONS

Glance et al. "A Single–Fiber WDM Local Access Network Based on Amplified LED Tranceivers", IEEE Photonics Technology Letters, vol. 8, No. 9, Sep. 1996. pp. 1241–1242.

Primary Examiner—Kinfe-Michael Negash

[57] ABSTRACT

A Wavelength Division Multiplexing (WDM) transceiver includes a Wavelength Multiplexer/Demultiplexer (WM/D) having a plurality of inputs (N) and N Amplified Light Emitting (ALED) devices, each ALED device transmitting a wideband optical signal to and receiving an optical signal from a different one of the N inputs of the WM/D transceiver. During transmission, the WM/D selects different wavelengths from ALED signals at each of the N inputs and multiplexes them together into a combined signal at its output. During receiving, the WM/D demultiplexes different wavelengths from a signal received at its output and sends the different wavelengths to each of the N inputs. A WDM system is formed using two WDM transceivers which are connected over an optical link and which alternately transmit and receive signals.

21 Claims, 10 Drawing Sheets

FULL-DUPLEX WAVELENGTH DIVISION MULTIPLEXING SYSTEM USING SINGLE-DEVICE TRANSCEIVERS

TECHNICAL FIELD OF THE INVENTION

This invention relates to Wavelength Division Multiplexing (WDM) optical communication systems and, more particularly, to a WDM optical system that uses Amplified Light Emitting Devices (ALED).

BACKGROUND OF THE INVENTION

The complexity and cost of local access networks can be significantly decreased by using the dual capability of semiconductor light sources to both emit and detect light. Based on this property, a very simple full-duplex communication system can be realized with a single fiber connected at both ends to a single optical device, which operates as a transceiver, transmitting and photodetecting alternatively, in the so called "ping-pong" mode. A local access network based on this principle has been recently reported by T. Kurosaki, et al, "Dynamic Properties of 1.3 $\mu$m Semi-insulating BH Light-Emission-and-Detection (LEAD)-diode for Subscriber TCM Transmission Systems", Elec. Letters, vol. 31, February 1995, pp. 189–191. That system uses a laser transmitter in a Time-Division Multiplex (TDM) arrangement with a star coupler to multiplex a plurality of links together in the same fiber. Undesirably, because of the multiplexing technique used, each link must be modulated at a relatively high bit rate to transmit signals in assigned time slots and consequently the power budget and required receiver sensitivity must be increased accordingly. In addition, TDM imposes very stringent synchronization requirements between the upstream links. What is needed is a simple local access network based on the "ping-pong" mode having none of the above problems.

SUMMARY OF THE INVENTION

In accordance with the present invention, a Wavelength Division Multiplexing (WDM) transceiver is disclosed which solves the above problems. The WDM transceiver includes an optical Wavelength Multiplexer/Demultiplexer (WM/D) having a plurality (N) of inputs and N Amplified Light Emitting (ALED) devices, each ALED device transmitting a wideband optical signal to and receiving an optical signal from a different one of the N inputs of the WM/D transceiver. In the transmit mode, the WM/D selects different wavelengths from ALED signals at each of the N inputs and multiplexes them together into a combined signal at its output. In the receive mode, the WM/D demultiplexes different wavelengths from a signal received at its output and sends the different wavelengths to each of the N inputs. The WM/D may be a implemented using a Wavelength Grating Router (WGR) or a dielectric film interference filter multiplexer/demultiplexer.

A WDM system is formed using a first WDM transceiver for alternately transmitting optical signals to and receiving optical signals from a first end of an optical link and a second WDM transceiver for alternately transmitting optical signals to and receiving optical signals from a second end of the optical link.

BRIEF DESCRIPTION OF THE DRAWING

In the drawing,

FIG. 5 shows a switching circuit for use with the type of ALED shown in FIG. 4;

FIG. 5a shows a switching circuit for use with the type of ALED shown in FIG. 4a;

DETAILED DESCRIPTION

In the following description, each item or block of each figure has a reference designation associated therewith, the first number of which refers to the figure in which that item is first located (e.g., 110 is located in FIG. 1).

Figure 1:
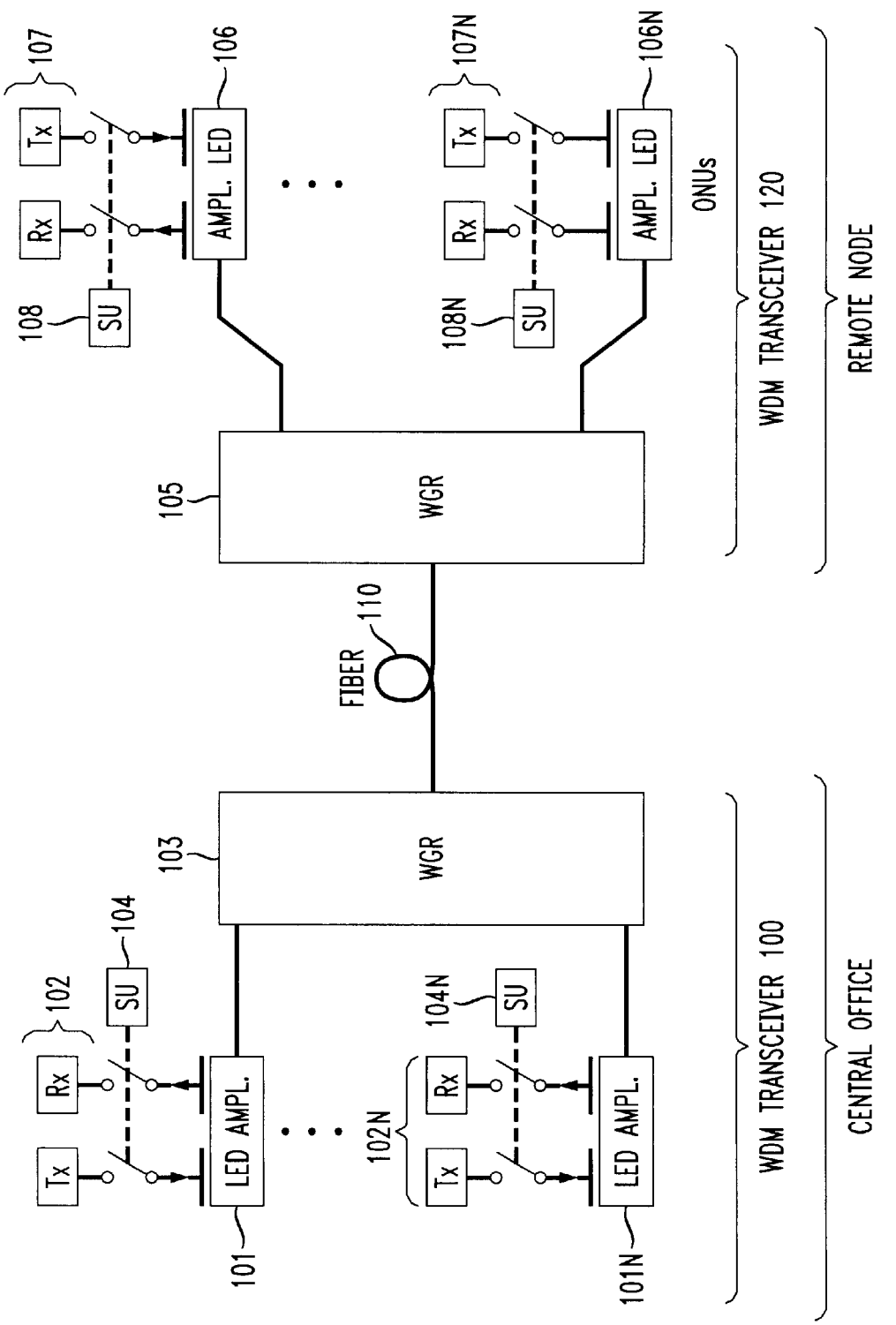
FIG. 1 shows an illustrative block diagram of a full-duplex Wavelength Division Multiplexing (WDM) system using Amplified Light Emitting Devices (ALED) as transceivers at the Central Office (CO) and at the Optical Network Units (ONUs) at the Remote Node (RN)
Figure 2A:
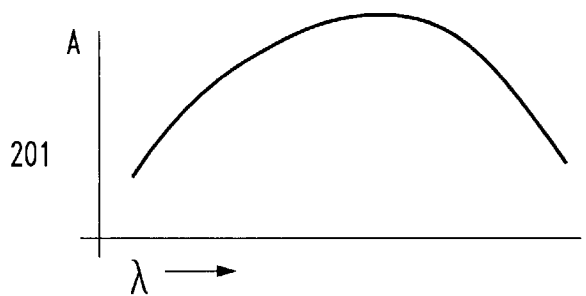
FIG. 2 shows illustrative light signals at various locations of the system of FIG. 1.
Figure 2B:
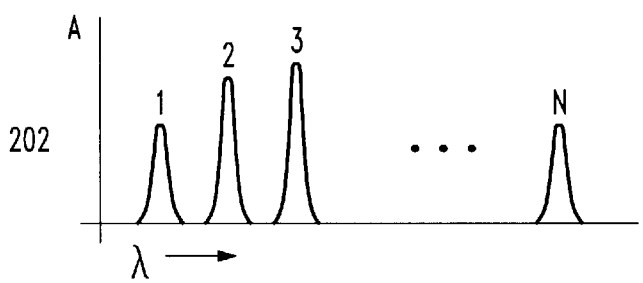
Figure 2C:
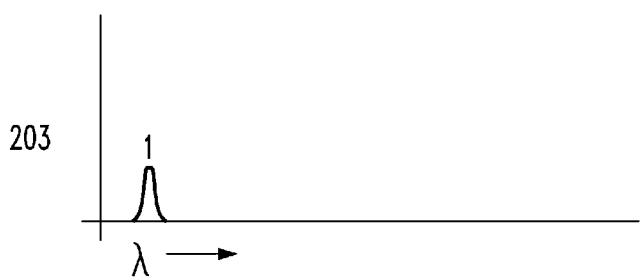
Figure 2D:
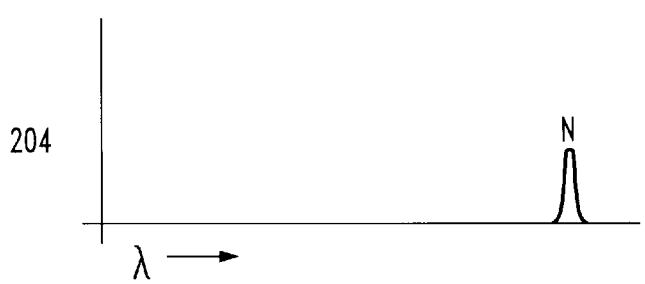

In accordance with the present invention, there is shown in FIG. 1 an illustrative block diagram of a full-duplex Wavelength Division Multiplexing (WDM) system using Amplified Light Emitting Devices (ALED) as transceivers of the Optical Network Units (ONUs). This system is also described in our article authored by B. Glance et al, entitled "A Single-Fiber WDM Local Access Network Based on Amplified LED Transceivers", published in IEEE Photonics Technology Letters, Vol. 8, No. 9, dated September, 1996, pp 1241–1242, which is incorporated by reference herein.

While our system may be utilized in a variety of applications, for illustrative purposes in FIG. 1 it is described as a local access network for connecting a group of users at a Remote Node (RN) to a Central Office (CO). For the same network capacity, our system can operate at much lower bit rates than that of the prior art TDM system, therefore, the power budget and the needed receiver sensitivity are reduced accordingly. Furthermore, since the ALED transceivers are modulated independently no synchronization between them is required as is the case in the prior art TDM system.

As shown in FIG. 1, a WDM transceiver 100 located at the Central Office (CO) of our system, includes WGR 103 and N ONUs, each ONU including an ALED, e.g., 101, a switch control unit (SU), e.g., 104, and a transmitter/receiver unit, e.g., 102. The array of Amplified Light Emitting Diodes (ALEDs), 101–101 N, interface each transmitter/receiver units, 102–102N, individually to each of the inputs of a 1×N Wavelength Grating Router (WGR) 103. While the present invention will be described as using a Wavelength Grating Router (WGR), it should be understood that it more generally may be implemented using other types of optical Wavelength MultiplexersDemultiplexers (WM/Ds). For example, a well known dielectric film interference filter made by Optical Corporation of America can also be used as the WM/D.

Since the local access network of FIG. 1 is symmetrical, the implementation of the WDM transceiver 120 located at the Remote Node (RN) is the same as that for the CO. The RN connects to the CO over the optical link 110, illustratively a single optical fiber. The RN includes WGR 105, and ONUs including ALEDs 106–106N, switch control units (SU)108–108N and transmitter/receiver units, 107–107N. The same type of ALEDs and WGRs are used at the RN and CO. It should be noted that, typically, the ONUs are not co-located with WGR 105, as they are at the CO, but rather the ONUs may be distributed at varying distances from WGR 105.

Downstream Operation

The downstream signal is generated by the array of ALEDs 101–101N connected individually to the inputs of a 1×N WGR 103. During a transmit mode, broadband optical signals are transmitted from each ALED 101–101N, as shown by 201 of FIG. 2. These signals are all inputted to WGR 103 which spectrally slices each to a different set of carriers and wavelength multiplexes these signals into a single downstream signal exiting the WGR 103 output port. With reference to FIG. 2, the wavelengths (λ) and amplitudes (A) of these multiplexed signals from the N ALEDs are shown. The resulting downstream signal comprises N signal components, each in a different passband. The signal is carried by a single fiber 110 to the RN where a second identical WGR 105 demultiplexes and routes the signal components to their respective ONU. Shown in 203 and 204 are the signals received by ALED 106 and 106N, respectively. These received signals components 1–N are photo-detected by their respective ALED 106–106N when switched in its receiving mode.

Upstream Operation

The ALEDs 106–106N generate an upstream signal when switched to its transmitting mode by switch unit 108. The signals coming from the ONUs are spectrally sliced and multiplexed by the WGR 105 at the RN. The upstream signal thus obtained is carried by the same single fiber 110 to the CO. There, the WGR 103 demultiplexes and routes the upstream components to their respective ALEDs 101–101N switched to their receiving mode by their respective switch unit 104–104N. With reference to FIG. 2, the upstream signals from ALEDs 106–106N appear as shown by 201, the output signal from WGR 105 appears as shown by 202 and the received signals at ALEDs 101–101N appear as shown by 203–204.

Duplex Traffic

Figure 3:
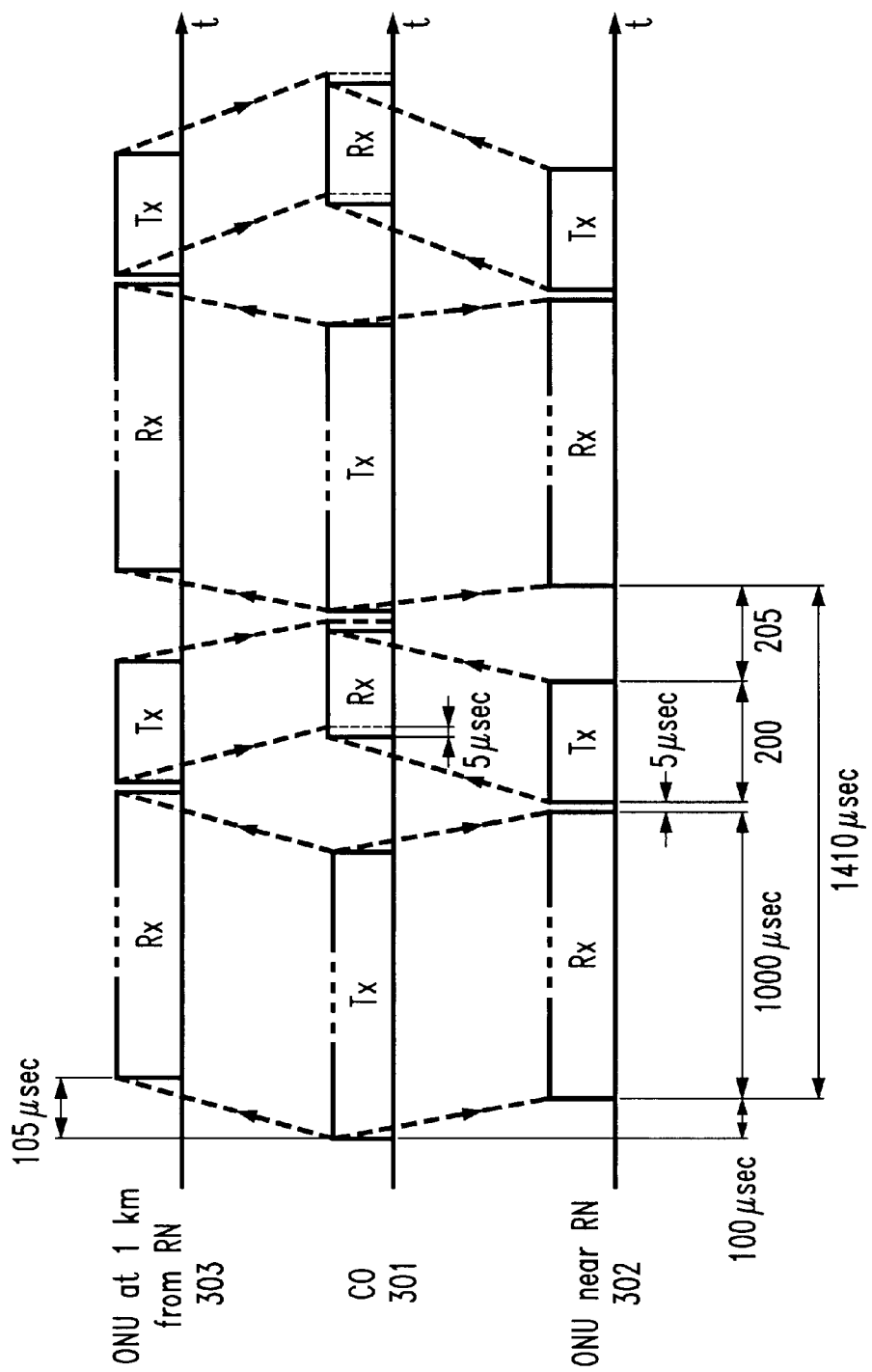
FIG. 3 shows the time slot pattern for the system of FIG. 1.

With reference to one illustrative timing arrangement shown in FIG. 3, downstream Tx and upstream Rx traffic may be transmitted at similar bit rates in consecutive time slots of different duration. This arrangement minimizes the time overhead allotted to reversing traffic directions on the same single fiber 110. As shown by 301, the downstream signals are generated at the CO simultaneously over a time slot lasting 1 msec. They arrive simultaneously 100 μsec later at the RN (assumed to be 20 km away) and reach their respective ONU after an additional time interval. That time interval can vary from zero (302 of FIG. 3), to 5 μsec (303 of FIG. 3) depending on the ONU location relative to the RN (for 303 of FIG. 3, we assumed that the maximum distance is 1 km). After a deadtime (quiescent time) of 5 μsec provided (by switch unit 108 of FIG. 1) for switching the ALEDs from their receiving mode to their transmission mode, the upstream components are transmitted during 200 μsec at a bit rate half that used for transmitting the downstream traffic. This assumes that the effective data rate carried by the upstream signals is one tenth that carried by the downstream signals. Because of the ONUs range disparity, the upstream signal reaches the CO between 105 μsec and 110 μsec later.

To avoid overlapping between reception and transmission at the CO, the next downstream time slot starts 410 μsec after the end of the previous transmission, see FIG. 3. The same cycle is repeated periodically every 1410 μsec (in this example). The deadtime interval of 205 μsec between transmission and reception time slots avoids noise reception from Rayleigh scattering and from possible optical reflections. It also provides enough time for the receiver to return to a quiet state. Consequently, the transmission rates of the downstream and upstream traffic are 1.41 and 7.05 times higher in this example, respectively, than their effective data rates. Transformation between periodic packets of data and continuous data can be done using low cost buffer interfaces.

Waveguide Grating Router

As previously noted, the system uses two identical WGRs, one at the CO the other at the RN. At the CO, the WGR 103 spectrally slices a different predetermined band from the broadband light signal received from each of the ALEDs, 101–101N, and multiplexes these different bands together into a transmission signal. The WGR 105 at the RN operates similarly on the light signals from ALEDs 106–106N.

Both WGRs 103 and 105 may be fabricated using silicon technology. The operation and construction of a WGR is described in the article by C. Dragone, C. A. Edwards and R. C. Kisfier, "Integration Optics NXN Multiplexer on Silicon", IEEE Photonics Tech. Letters, vol.3, no.10, pp.896–899, October 1991 which is incorporated by reference herein.

Aled Transceivers

Figure 4A:
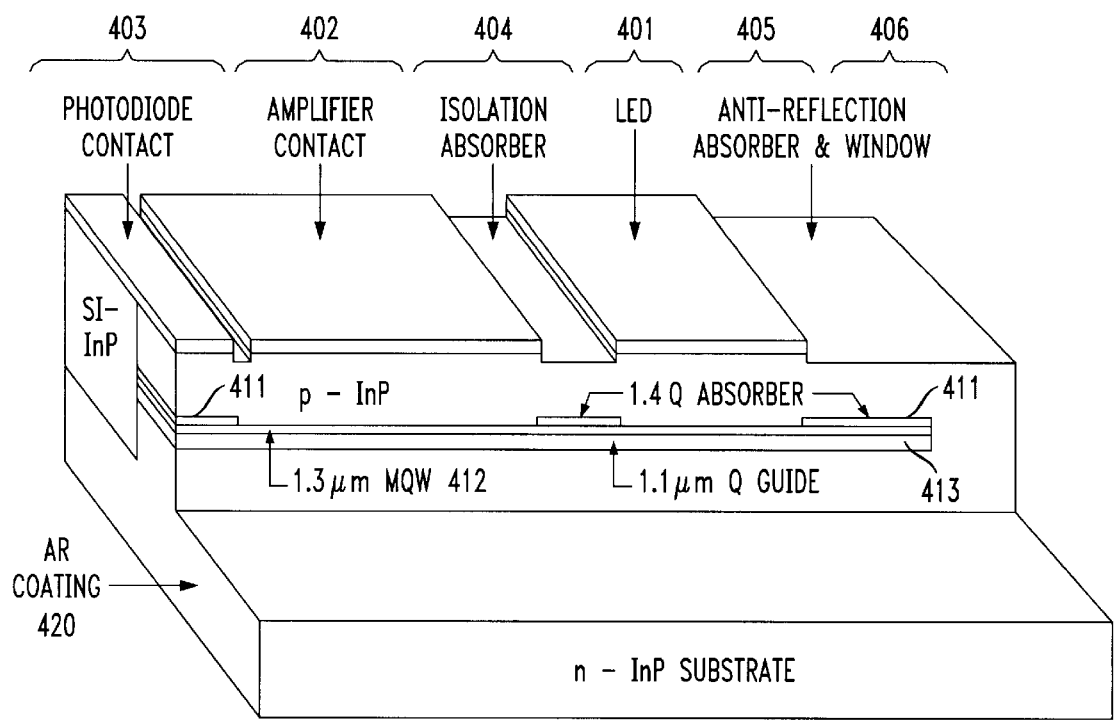
FIG. 4a shows an another illustrative monolithically integrated ALED transceiver.
Figure 4B:
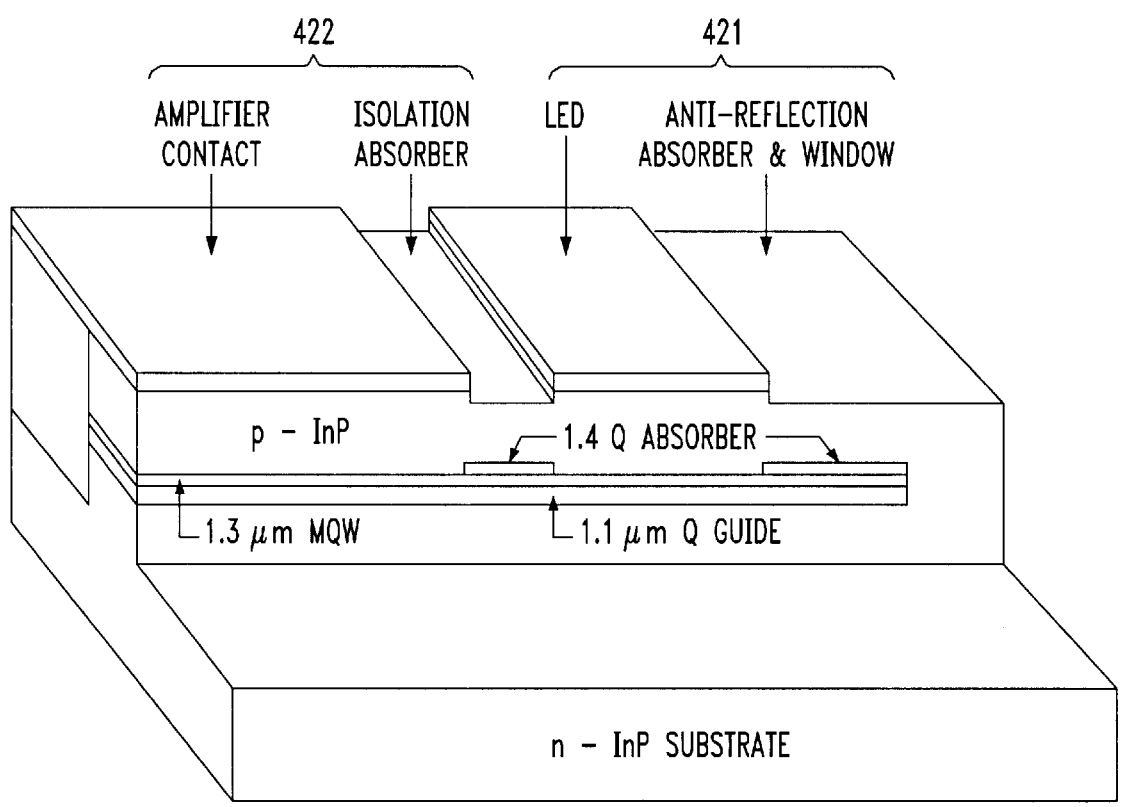
FIG. 4 shows an illustrative monolithically integrated version of an Amplified Light Emitting Device (ALED) transceiver.

Shown in FIG. 4 is an illustrative monolithically integrated version of ALED device for use in a WDM transceiver of the spectrally-sliced WDM system of FIG. 1. As shown, the ALED consists of three sections the LED 401, amplifier 402 and photodiode 403 (e.g., a PIN diode) sections. In the transmission mode the LED section 401 carries the modulation signal and acts as a conventional LED and the amplifier section 403 amplifies the light emitted by the LED. The device structure of the photodiode is optimized for receiving light. It can have a structure similar to the amplifier, but the length is reduced to decrease its capacitance so as to increase the speed of light detection. The photodiode section 403 is not active during the transmit mode, but it is forward biased such that it does not absorb light. As a transmitter source, the integrated LED-amplifier sections 401 and 402 are switched together by a switch unit SU as described later in FIG. 5. The integrated LED-amplifier sections 401 and 402 may illustratively operate at 1.3-μm wavelength with about 10-mW chip output power and a few mW power coupled into a single mode fiber 110.

In the receiving mode, the LED 401 and amplifier 402 sections are disabled and the photodiode section 403 is enabled. In the receive mode, the photodiode section 403 is used as a waveguide photodetector. The switch units SUs controls the ALEDs to be alternatively switched between transmit mode during which the ALEDs transmit data downstream and the receive mode during which the ALEDs act as photodiodes for detecting upstream data.

According with another embodiment of the present invention, shown in FIG. 4a, each ALED may include two sections. The two section version of the ALED is also described in our article authored by K.-Y. Liou et al, entitled "Monolithically Integrated Semiconductor LED-Amplifier for Applications as Transceivers in Fiber Access Systems", IEEE Photonics Technology Letters, Vol. 8, No. 6, dated June, 1996, pp 800–802, which is incorporated by reference herein.

In the transmission mode the LED section 421 carries the transmitters modulation signal and acts as a conventional LED. The amplifier section 422 amplifies the broadband distributed light emitted by the LED and sends it over the link to the WGR 103. In the receiving mode, the amplifier section 422 is used as a photodiode (without bias voltage) to receive light (optical) signals from the WGR 103. Each ALED is alternatively switched, by its switch control unit (e.g., the switch unit of FIG. 5a), between a time interval (Tx of FIG. 3) during which the ALEDs transmit data downstream (to the ONUs) and a time interval (Rx of FIG. 3) during which the ALEDs act as photodiodes for detecting upstream data (from the ONUs).

It should be noted that both types of FIG. 4 devices which operate in the 1.5-$\mu$m wavelength band may also be fabricated using similar designs. The integrated device design of FIG. 4 may significantly reduce packaging costs. The multiple functionality of the device as a transceiver simplifies the design of the optical communication system of FIG. 1.

The structure of the monolithically integrated ALED of FIG. 4 is shown to have three active elements 401, 402, and 403. The "back" section is used as a conventional LED 401 and the "front" section includes an amplifier 402 which amplifies the input from the LED to a high output power and a photodiode 403 which detects signals received by the ALED. The ALED may be fabricated as a single-mode buried heterostructure waveguides, similar to those used for the semi-insulating blocked buried heterostructure laser described in the article of U. Koren et al "Semi-insulating blocked planar buried heterostructure GaInAs-InP (Gallium-Indium-Phosphide) laser with high power and modulation bandwidth," Electron Lett., vol. 24, pp. 138–139, 1988, which is incorporated by reference herein.

The active regions consist of six compressively strained 50 Å-thick InGaAsP (Indium-Gallium-Arsenide-Phosphide) ($\lambda$g=1.36 $\mu$m) quantum wells (shown as 412) with 150-Å-thick InGaAsP ($\lambda$g=1.1 $\mu$m) barriers and an underlying 2000Å-thick InGnAsP ($\lambda$g=1.1 $\mu$m) guiding layer (shown as 413). The same active waveguide structure is used for both the LED and the amplifier for optical emission and gain around 1.3-$\mu$m. wavelength. To integrate the LED with an amplifier, it is necessary to provide partial optical isolation between the two to avoid bridging them into a single element. We used a simple waveguide Q absorber 411 that provides sufficient optical attenuation while allowing a portion of the LED light to enter the amplifier. As shown in FIG. 4, a thin InGaAsP ($\lambda$g=1.4 $\mu$m) layer 411 is used on top of the MQW layer 412 to absorb more uniformly the LED light over a broad special range. The length of the isolation absorber (40–60 $\mu$m) (shown as 404) is adjusted by device design to provide 6 to 8 dB attenuation while transmitting about 0.2 mW LED light into the amplifier. Without the isolation segment (shown as 404) in the middle, the device would become a long superluminesent diode, and it would be difficult to achieve high power without oscillation. The back side of the LED has a 170-$\mu$m-long waveguide absorber (shown as 405) followed by a 130-$\mu$m unguided window region (shown as 406) to eliminate optical reflections from the back facet. The lengths of the integrated amplifier 402, LED 401 and photodiode 403 are approximately 550 $\mu$m, 300 $\mu$m and 75 $\mu$m, respectively. The output facet 420 of the amplifier is antireflection coated.

The device may be grown by four-step metal organic vapor phase epitaxy (MOVPE). The 1.4 $\mu$m bandgap InGaAsP layer on the base wafer (shown as 411) is removed from the LED, amplifier and photodiode regions by selective etching using a thin hip layer as an etch stop. The window region (shown as 406) is defined by nonselective etching to remove the waveguide layers. The following waveguide mesa etch, regrowths, and metallization are similar to standard Fabry-Perot laser processing. We note that the ALED design of FIG. 4 is a very simple photonic integrated circuit (PIC). Since a standard semiconductor laser structure and simple PIC processing methods are used, the device can be manufactured using existing technologies and has the potential to be a low cost device for local access applications.

Switching Circuit

Figure 5A:
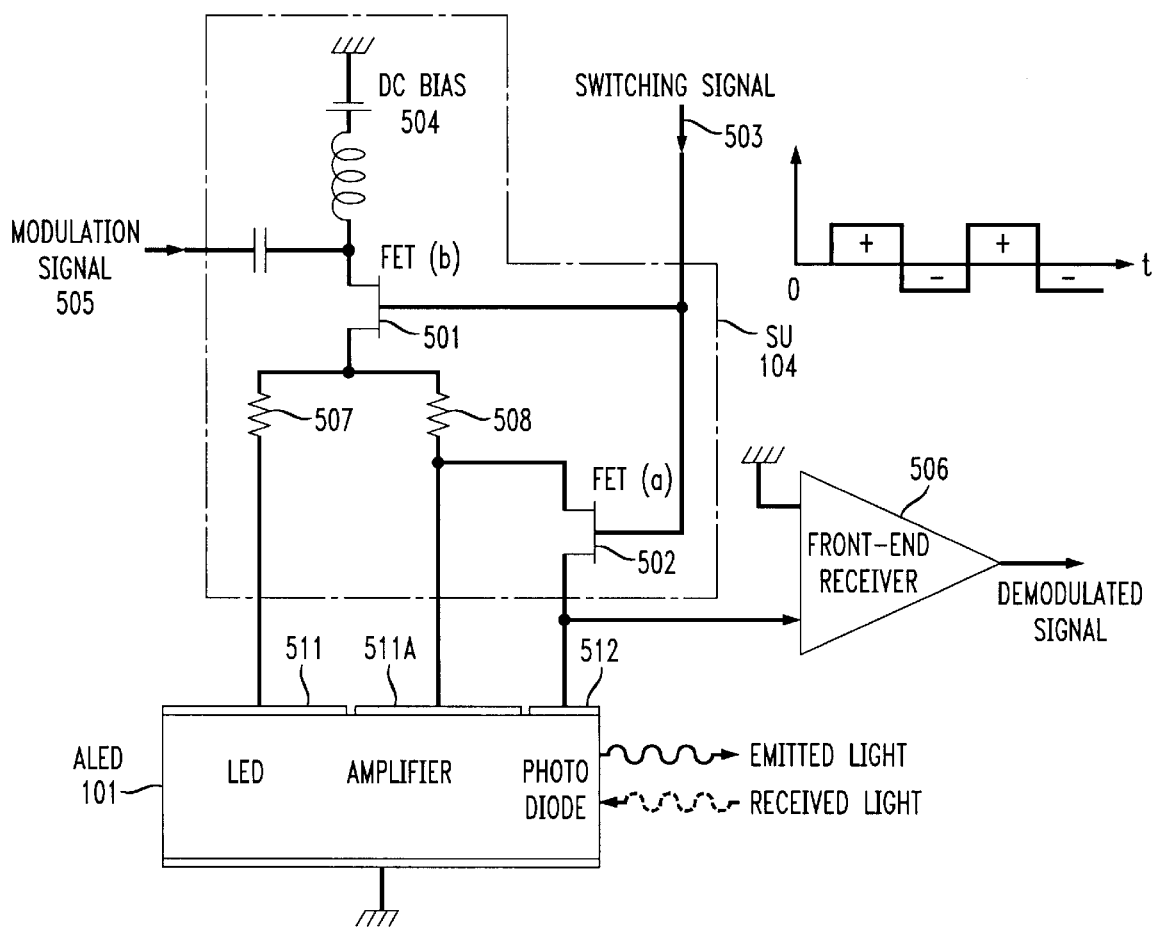
Figure 5B:
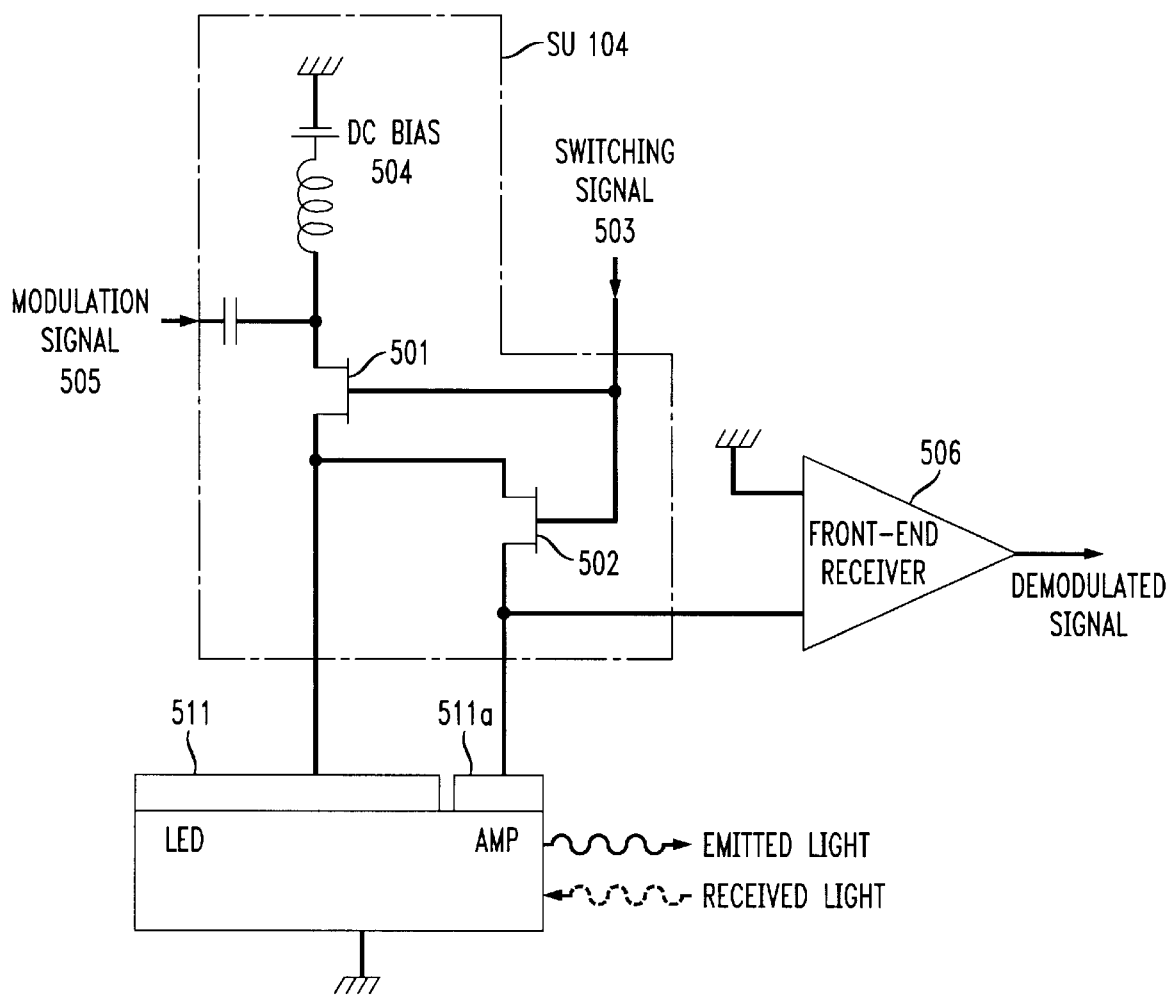

Shown in FIG. 5 is a switching unit SU (e.g., 104) used when an ALED (e.g., 101) of the system of FIG. 1 is of the type shown in FIG. 4. Each switch unit consists of two Field Effect Transistors (FETs), 501 and 502, acting as switches activated by a switching signal 503. The FETs present a low series resistance during its conductive state (when a positive switching signal 503 is applied) and a very high resistance during its non-conductive state (when a negative switching signal 503 is applied). In the transmit mode, a positive switching signal 503 is applied to FETs 501 and 502 causing them both into their conductive state. In this mode FET 502 connects the photodiode electrode 512 to the front electrode 511a of the amplifier section. During the transmit mode, the front-end receiver 506 is saturated by the voltage developed across the photodiode section and cannot detect received light signals. The other FET 501 applies the dc biasing 504 and the modulation signal 505, via resistors 507 and 508, to the LED electrode 511 and amplifier electrode 511a of ALED (e.g.,101) to produce a modulated emitted light signal. In the receive mode the FETs 501 and 502 are non-conducting. Thus, FET 501 removes the dc bias and modulation from the ALED while the photodiode is disconnected from the amplifier section by the FET 502. After switching to the receive mode, in this example, there is a 205 $\mu$sec deadtime interval before signal reception, see FIG. 2. This deadtime interval is long enough for the front-end receiver 506 to return to its high sensitivity state to enable it to receive the demodulated signal from the photodiode.

Shown in FIG. 5a is a switching unit SU (e.g., 104) used when an ALED (e.g., 101) of the system of FIG. 1 is of the type shown in FIG. 4a. As shown FET 501 connects to the LED section 511 and FET connects to the amplifier 511a. During the transmit mode both FETs 501 and 502 are in their conductive state enabling DC bias and the modulation signal to be applied to the LED 511 and the amplifier 511a. As a result the emitted light is generated. In the receive mode, mode both FETs 501 and 502 are in their non-conductive state and no DC bias or modulation signal is applied to the LED and the amplifier. The amplifier 511a then acts as a photodetector and outputs a detected electrical signal to the receiver 506.

Simultaneous Multi-Transceiver (SMT) at the Central Office

Figure 6:
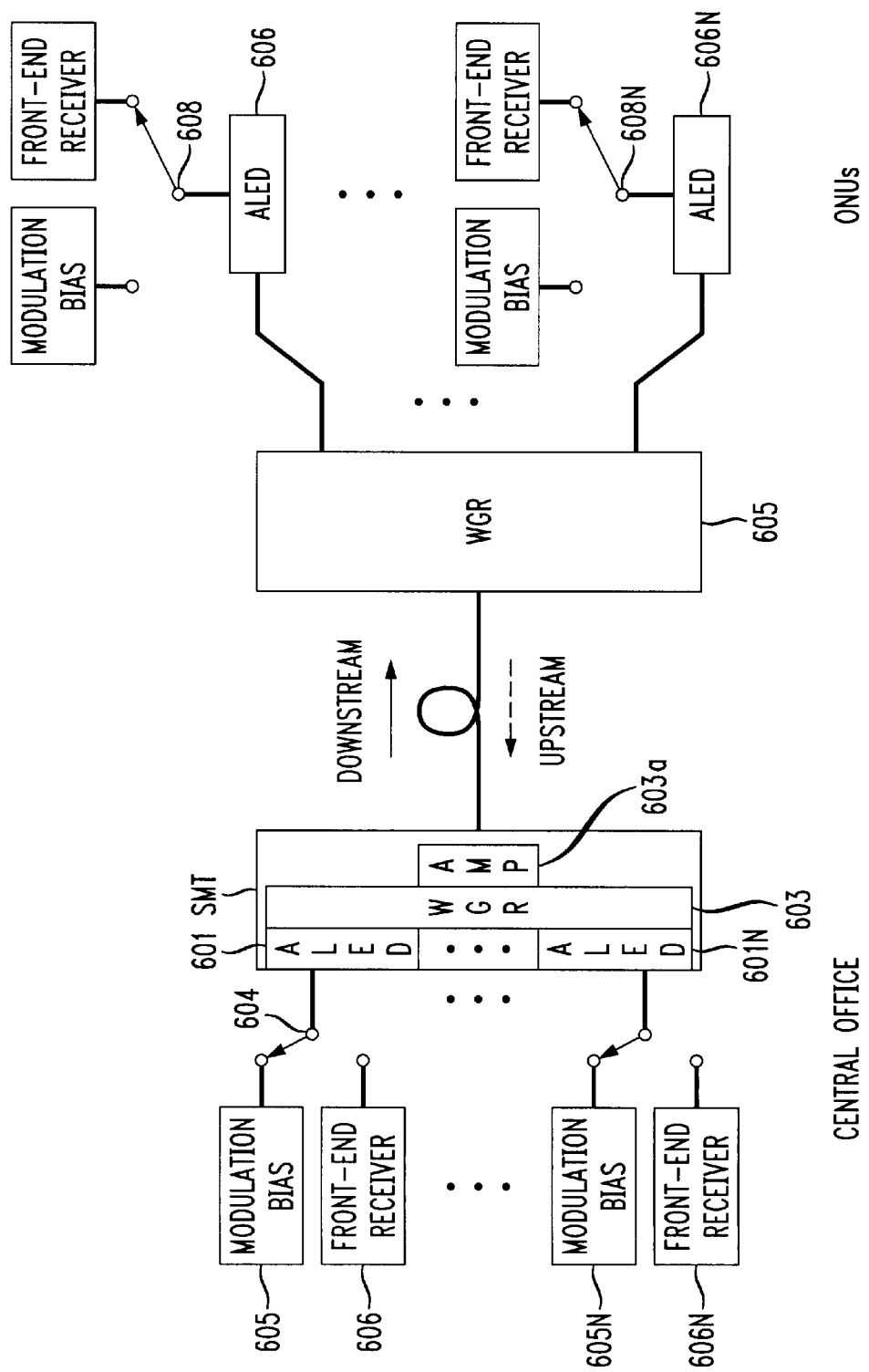
FIG. 6 shows another embodiment of a full-duplex Wavelength Division Multiplexing (WDM) system using a Simultaneous Multi-Transceiver (SMT) at the CO and ALEDs at the ONUs.

Another embodiment of the full-duplex Wavelength Division Multiplexing (WDM) system is shown in FIG. 6. The system of FIG. 6 differs from that of FIG. 1 in that a Simultaneous Multi-Transceiver (SMT) 600 is used at the CO. Since the ALEDs and the WGR are co-located at the CO, they can be integrated together on a same Indium Phosphide (Inp) wafer in a manner similar to the configuration of a Multi-Frequency Laser (MFL). Such an MFL configuration is described in the article by M. Zirngibl and C. H. Joyner, "12 Frequency WDM Laser Based on a Transmissive Waveguide Grating Router", Elec. Letters, vol.30, no.9, pp.701–702, April 1994, and incorporated by reference herein.

As shown the SMT 600 integrates together on one chip (e.g., an InP chip), an array of ALEDs 601–601N, a WGR 603 and a Bi-directional amplifier 603a. Otherwise, the remaining units of the system of FIG. 6 (i.e., units 605, 606–606N, and 608–608N) are similar to and operate in the same manner as those previously described in FIG. 1, except that the amplifier 603a boosts the transmitted signal from the SMT 603. More importantly, this amplifier compensates partially the WGR insertion loss sustained by the received signal.

Figure 7:
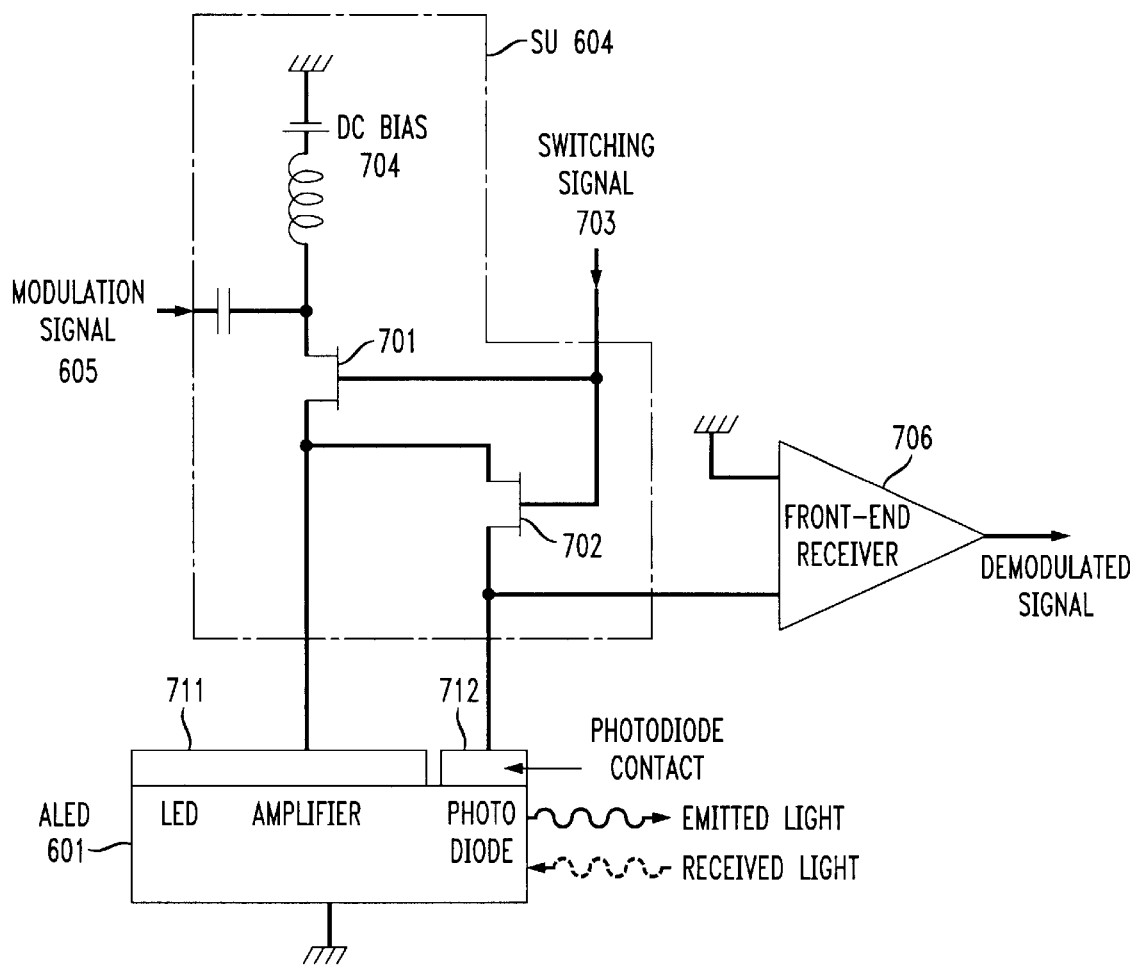
FIG. 7 shows a switching circuit of the SMT system of FIG. 6.

With reference to FIG. 7, the operation of switch unit SU (e.g.,604) is the same as that of SU 104 of FIG. 5. However, as shown the ALED 601 differs from ALED 101 shown in FIG. 5 in that it has two electrodes (rather than three) metallized on the active sections of the ALED. The shorter electrode 712 is used to control the photodiode in the manner as previously described in FIG. 5. The larger electrode 711 connects signals to both the LED and amplifier sections of the ALED 601. Thus, electrode 711 is the combination of electrodes 511 and 511 a of FIG. 5. The two electrodes 711 and 712 are connected together during transmit mode by a switching unit SU 604 similar to that shown in FIG. 5. The SU 604 differs from SU 104 of FIG. 5 in that it needs only one output from FET 701 without a series resistor.

Figure 8:
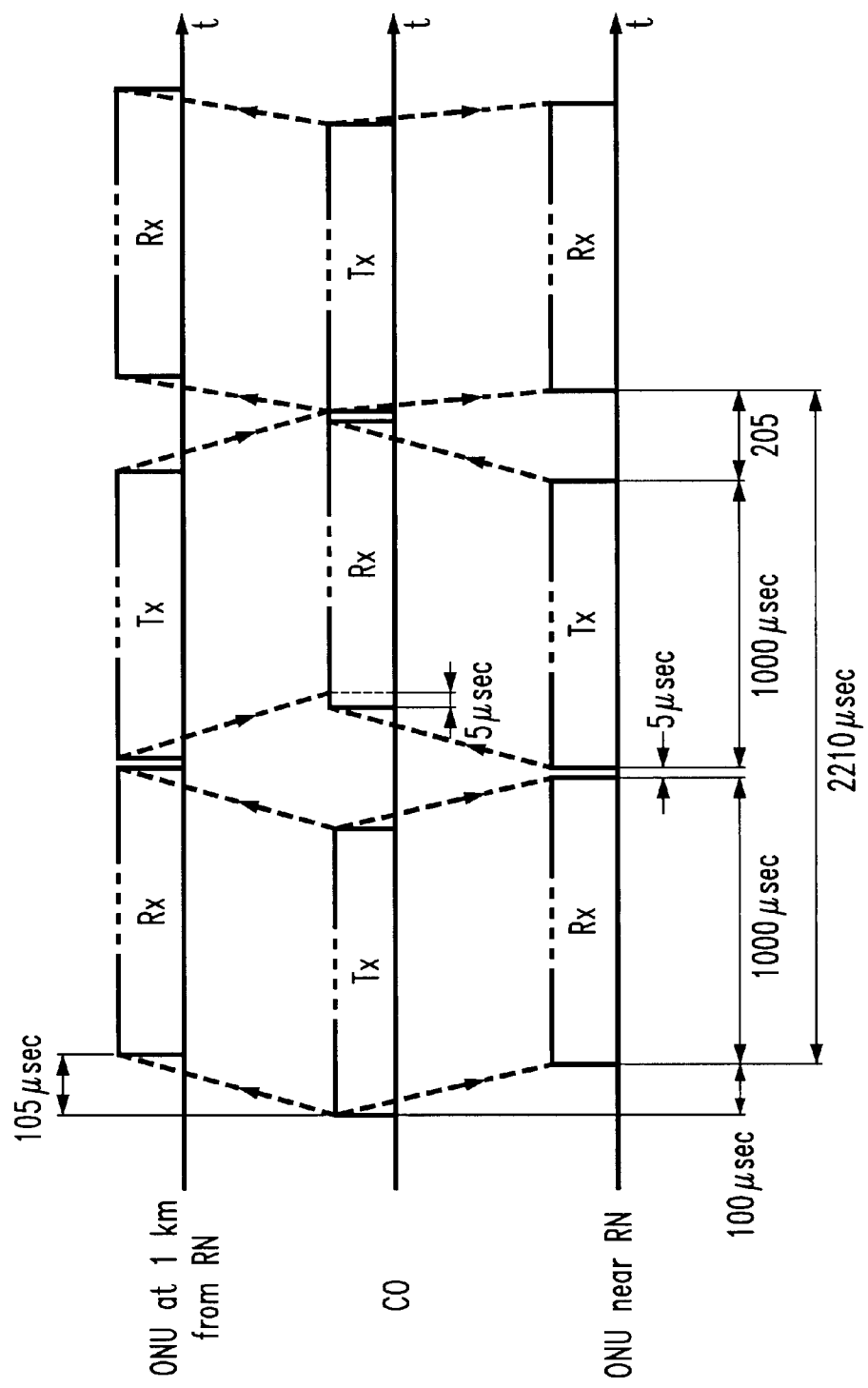
FIG. 8 shows the transmit and receive time slot pattern for the SMT system of FIG. 6.

The downstream and upstream traffic are now carried by signals at very different power levels. In this case, with reference to FIG. 8, the best strategy is to use the same time slot durations Tx and Rx and a different transmission rate for the two traffics. As before, we assume a ratio 10/1 between the effective data rates of the downstream and upstream traffics. Using a I msec time slot duration for the transmission Tx and reception Rx periods, yields, as before, a minimum deadtime interval of 205 μsec between transmission and reception periods. The effective data rate is thus 2.21 times lower than the transmission rate.

What has been described is merely illustrative of the application of the principles of the present invention. Other arrangements and methods can be implemented by those skilled in the art without departing from the spirit and scope of the present invention.

We claim:

1. A Wavelength Division Multiplexing (WDM) transceiver comprising
   a Wavelength Multiplexer/Demultiplexer (WM/D) having a plurality (N) of inputs and an output, for selecting different wavelengths from signals at each of the N inputs and multiplexing them together into a combined signal at the output and for demultiplexing different wavelengths from a signal received at its output and sending the different wavelengths at each of the N inputs and
   N Amplified Light Emitting (ALED) devices each for transmitting a wideband optical signal to and receiving an optical signal from a different one of the N inputs of the WM/D.

2. The WDM transceiver of claim 1 wherein at least one of the ALED devices includes a LED and an amplifier for transmitting the optical signal during a transmit mode and during a receive mode the amplifier is used as a detector to convert a received optical signal into an electrical signal.

3. The WDM transceiver of claim 1 wherein at least one of the ALED devices includes a LED and an amplifier for transmitting the optical signal and a photo-diode for converting a received optical signal into an electrical signal.

4. The WDM transceiver of claim 3 wherein the switching unit enables all of the ALED devices to transmit and receive at the same time.

5. The WDM transceiver of claim 3 wherein electrodes of the LED and amplifier are connected together for controlling the LED and amplifier unit.

6. The WDM transceiver of claim 1 further comprising a switching unit for each ALED device for controlling the transmitting and receiving periods of optical signals.

7. The WDM transceiver of claim 6 wherein the switching controller provides a transmission period which is longer than a receive period.

8. The WDM transceiver of claim 6 wherein the switching controller provides a transmission period which is shorter than a receive period.

9. The WDM transceiver of claim 6 wherein the switching controller provides a quiescent time period between the transmission period and the receive period.

10. The WDM transceiver of claim 9 wherein the chip includes a bidirectional optical amplifier connected in series with the output of the WGR.

11. The WDM transceiver of claim 6 wherein the switching unit controls the application of a modulation signal and a bias signal to its ALED device.

12. The WDM transceiver of claim 1 wherein at least one WM/D is a Wavelength Grating Router (WGR).

13. The WDM transceiver of claim 1 wherein at least one WM/D is a dielectric film interference filter multiplexer/demultiplexer.

14. The WDM transceiver of claim 1 wherein the WGR and ALEDs are integrated together on one chip.

15. A Wavelength Division Multiplexing (WDM) optical communication system comprising
   a first WDM transceiver arranged to alternately transmit optical signals to and receive optical signals from a first end of an optical link;
   a second WDM transceiver arranged to alternately transmit optical signals to and receive optical signals from a second end of the optical link;
   the optical link having respective ends connected to the first and second WDM transceivers;
   at least one of the first or second WDM transceivers including
      a Wavelength Multiplexer/Demultiplexer (WM/D) having a plurality (N) of inputs and an output, for selecting different wavelengths from signals at each of the N inputs and multiplexing them together into a combined signal for output to the optical link and for demultiplexing different wavelengths from a signal received from the optical link and sending the different wavelengths to each of the N inputs and
      N Amplified Light Emitting (ALED) devices each for transmitting a wideband optical signal to and receiving an optical signal from a different one of the N inputs of the WM/D.

16. The WDM system of claim 15 wherein both the first and second WDM transceivers are the same.

17. The WDM transceiver of claim 15 wherein at least one of the ALED devices includes a LED and an amplifier for transmitting the optical signal during a transmit mode and during a receive mode the amplifier is used as a detector to convert a received optical signal into an electrical signal.

18. The WDM transceiver of claim 15 wherein at least one of the ALED devices includes a LED and an amplifier for transmitting the optical signal and a photo-diode for converting a received optical signal into an electrical signal.

19. The WDM system of claim 15 further comprising a switching unit for each ALED device for controlling the transmitting and receiving periods of optical signals.

20. The WDM system of claim 15 wherein at least one WM/D is a Wavelength Grating Router (WGR).

21. The WDM system of claim 15 wherein at least one WM/D is a dielectric firm interference filter multiplexer/demultiplexer.

* * * * *